United States Patent
Bodine et al.

(10) Patent No.: US 8,984,977 B2
(45) Date of Patent: Mar. 24, 2015

(54) TRANSMISSION AND VARIABLE RADIALLY EXPANDING SPRING CLUTCH ASSEMBLY

(75) Inventors: Thomas J. Bodine, Glenwood, MD (US); Barry E. Plato, Bel Air, MD (US); Kevin S. Agan, Fallston, MD (US); Joao Norona, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 963 days.

(21) Appl. No.: 12/840,127

(22) Filed: Jul. 20, 2010

(65) Prior Publication Data
US 2010/0276244 A1 Nov. 4, 2010

Related U.S. Application Data

(62) Division of application No. 11/853,435, filed on Sep. 11, 2007, now Pat. No. 7,793,560.

(51) Int. Cl.
| F16H 61/32 | (2006.01) |
| F16D 7/00 | (2006.01) |
| F16D 7/10 | (2006.01) |
| F16D 43/208 | (2006.01) |
| F16H 35/10 | (2006.01) |
| F16H 3/32 | (2006.01) |

(52) U.S. Cl.
CPC F16D 7/002 (2013.01); F16D 7/10 (2013.01); F16D 43/208 (2013.01); F16H 3/32 (2013.01); F16H 35/10 (2013.01)
USPC .................................. 74/337; 74/352; 192/38

(58) Field of Classification Search
USPC ......... 74/352, 336 R, 337, 337.5; 192/104 C, 192/56.1, 31, 38
See application file for complete search history.

(56) References Cited

U.S. PATENT DOCUMENTS

| 1,325,464 | A | 12/1919 | Decker |
| 1,398,763 | A | 11/1921 | Bearens |
| 1,651,822 | A | 12/1927 | Johnston |
| 1,805,692 | A | 5/1931 | Ferenchi |
| 2,263,709 | A | 11/1941 | Sittert |
| 2,344,673 | A | 3/1944 | Brown |
| 2,631,696 | A | 3/1953 | Yarber |

(Continued)

FOREIGN PATENT DOCUMENTS

| DE | 1712948 A1 | 12/1955 |
| DE | 1712948 U | * 12/1955 |

(Continued)

OTHER PUBLICATIONS

Search Report—European Patent for related application EP08162397.

*Primary Examiner* — Roger Pang
(74) *Attorney, Agent, or Firm* — Scott B. Markow

(57) ABSTRACT

A transmission generally includes a shaft member having a cylindrical outer surface in which longitudinal grooves are formed. Rolling members are disposed in the longitudinal grooves. A gear member having lobes the lobes is disposed between the rolling members and over the shaft member. A clutch spring that at least partially encircles the rolling members and the lobes is also disposed. The clutch spring includes a reduced torque condition that at least defines the clutch spring stretching to accommodate the rolling members leaving the longitudinal grooves and moving to the outer cylindrical surface such that the clutch spring forms a generally elliptical shape in the reduced torque condition.

20 Claims, 12 Drawing Sheets

(56) References Cited

U.S. PATENT DOCUMENTS

| | | | |
|---|---|---|---|
| 2,668,426 | A | 2/1954 | Hoover |
| 2,692,486 | A | 10/1954 | Anderson |
| 2,860,498 | A | 4/1955 | Crossley |
| 2,957,323 | A | 9/1958 | Elliott et al. |
| 3,005,325 | A | 9/1958 | Nakamura et al. |
| 2,854,831 | A | 10/1958 | Rothweiler |
| 2,882,704 | A | 4/1959 | Quackenbush |
| 3,205,985 | A | 9/1965 | Pearl |
| 3,499,511 | A | 3/1970 | Strauch et al. |
| 3,616,883 | A | 11/1971 | Sindelar |
| 3,631,945 | A | 1/1972 | Ollearo |
| 3,667,575 | A | 6/1972 | Bouhot |
| 3,794,124 | A | 2/1974 | Biersack |
| 3,877,253 | A | 4/1975 | Yeagle |
| 3,934,629 | A | 1/1976 | Boman |
| 3,991,590 | A | 11/1976 | Brems et al. |
| 4,238,978 | A | 12/1980 | Leone |
| 4,265,347 | A | 5/1981 | Dischler |
| 4,362,161 | A | 12/1982 | Reimels et al. |
| 4,572,041 | A | 2/1986 | Rissmann |
| 4,619,567 | A | 10/1986 | Campbell |
| 4,830,001 | A | 5/1989 | Walus |
| 4,901,610 | A | 2/1990 | Larson et al. |
| 4,979,408 | A | 12/1990 | Hayashi |
| 4,986,369 | A | 1/1991 | Fushiya et al. |
| 5,123,313 | A | 6/1992 | Andersson |
| 5,201,374 | A | 4/1993 | Rahm |
| 5,309,799 | A | 5/1994 | Jore |
| 5,346,023 | A | 9/1994 | Takagi et al. |
| 5,540,527 | A | 7/1996 | Bohnet et al. |
| 5,704,261 | A | 1/1998 | Strauch et al. |
| 5,722,894 | A | 3/1998 | Kojima |
| 5,737,983 | A | 4/1998 | Rennerfelt |
| 5,746,298 | A | 5/1998 | Krivec et al. |
| 5,862,705 | A | 1/1999 | Lee |
| 5,868,208 | A | 2/1999 | Peisert et al. |
| 6,053,675 | A | 4/2000 | Holland et al. |
| 6,062,114 | A | 5/2000 | Rahm |
| 6,076,438 | A | 6/2000 | Rahm |
| 6,123,157 | A | 9/2000 | Barnes |
| 6,321,855 | B1 | 11/2001 | Barnes |
| 6,330,846 | B1 | 12/2001 | Strauch |
| 6,345,560 | B1 | 2/2002 | Strauch et al. |
| 6,487,943 | B1 | 12/2002 | Jansson et al. |
| 6,536,536 | B1 | 3/2003 | Gass et al. |
| 6,568,693 | B2 | 5/2003 | Glass |
| 6,640,911 | B2 | 11/2003 | Lieser |
| 6,644,150 | B2 | 11/2003 | Chen |
| 6,702,090 | B2 | 3/2004 | Nakamura |
| D488,695 | S | 4/2004 | Peterson |
| 6,793,023 | B2 | 9/2004 | Holzer |
| 6,796,921 | B1 | 9/2004 | Buck et al. |
| 6,834,730 | B2 | 12/2004 | Gass et al. |
| RE38,778 | E | 8/2005 | Eggert et al. |
| D516,894 | S | 3/2006 | Singh |
| 7,063,201 | B2 | 6/2006 | Nakamura et al. |
| 7,086,813 | B1 | 8/2006 | Boyle et al. |
| 7,093,668 | B2 | 8/2006 | Gass et al. |
| 7,107,883 | B2 | 9/2006 | Casutt |
| 7,121,358 | B2 | 10/2006 | Gass et al. |
| 7,134,509 | B2 | 11/2006 | Rahm |
| 7,150,680 | B2 | 12/2006 | White |
| 7,197,968 | B2 | 4/2007 | Bubel |
| 7,318,691 | B2 | 1/2008 | Osburn |
| D589,319 | S | 3/2009 | Peters |
| 2002/0130006 | A1 | 9/2002 | Nakamura |
| 2002/0135140 | A1 | 9/2002 | Mitchell et al. |
| 2004/0099106 | A1 | 5/2004 | Strauch et al. |
| 2006/0233621 | A1 | 10/2006 | Schell et al. |
| 2006/0254786 | A1 | 11/2006 | Murakami et al. |
| 2007/0125192 | A1 | 6/2007 | Mowbray et al. |
| 2008/0107491 | A1 | 5/2008 | Osburn |
| 2008/0217870 | A1 | 9/2008 | Shibata |
| 2009/0114176 | A1 | 5/2009 | Wutzler |

FOREIGN PATENT DOCUMENTS

| | | | |
|---|---|---|---|
| DE | 1725799 | U | 7/1956 |
| DE | 7403870 | U | 5/1974 |
| DE | 2335184 | A1 | 1/1975 |
| DE | 2427352 | A1 | 12/1975 |
| DE | 2511469 | A1 | 9/1976 |
| DE | 3104626 | A1 | 9/1982 |
| DE | 3443072 | A1 | 5/1986 |
| DE | 8607168 | U1 | 7/1987 |
| DE | 3807308 | A1 | 9/1989 |
| DE | 4143218 | A1 | 9/1992 |
| DE | 4143678 | B4 | 9/1992 |
| DE | 4300083 | A1 | 7/1994 |
| DE | 19722798 | A1 | 12/1998 |
| DE | 10122272 | A1 | 11/2002 |
| DE | 102006021506 | A1 | 11/2006 |
| DE | 102005057368 | A1 | 6/2007 |
| EP | 0608083 | A1 | 7/1994 |
| EP | 0608083 | A1 * | 7/1994 |
| EP | 0988134 | A1 | 3/2000 |
| GB | 1333153 | A | 10/1973 |
| JP | 2004141332 | A | 5/2004 |
| JP | 2007190666 | A | 8/2007 |
| WO | 2007/104286 | A1 | 8/2007 |

* cited by examiner

TRANSMISSION AND VARIABLE RADIALLY EXPANDING SPRING CLUTCH ASSEMBLY

CROSS-REFERENCE TO RELATED APPLICATIONS

This application is a divisional of U.S. patent application Ser. No. 11/853,435, filed Sep. 11, 2007, now U.S. Pat. No. 7,793,560.

FIELD

The present teachings relate to a radially expanding spring clutch that can be used in a transmission to reduce torque transmitted therethrough when a threshold torque is surpassed.

BACKGROUND

Certain types of drills and drivers can produce enough torque through reduction gearing that manufacturers include an overdrive clutch between the tool spindle and the motor. This is done to avoid scenarios where the tool can overpower the user or a component in the transmission of the tool could be damaged.

When a threshold torque is surpassed, the overdrive clutch can open and reduce or eliminate the torque that is transmitted through the clutch. By reducing the torque, the user can continue to hold the tool and/or can avoid possible damage to the transmission. Notwithstanding, the overdrive clutch can be relatively large, it typically includes many components and can be relatively complex. A relatively high part count and associated complexity can add additional costs to the tool.

SUMMARY

The present teachings generally include a transmission that includes a shaft member having a continuous cylindrical surface portion longitudinally disposed next to a cylindrical outer surface portion interrupted by longitudinal grooves. A first gear assembly has a first clutch spring that holds a first set of rolling members between lobes that extend from a first output gear. A second gear assembly has a second clutch spring that holds a second set of rolling members between lobes that extend from a second output gear. The first gear assembly and the second gear assembly are configured to move longitudinally along the shaft member to a position where at least one of the first gear assembly and the second gear assembly is engaged for rotation with the shaft member when a value of torque at the shaft member is below a torque threshold value.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings.

DETAILED DESCRIPTION

Figure 1:
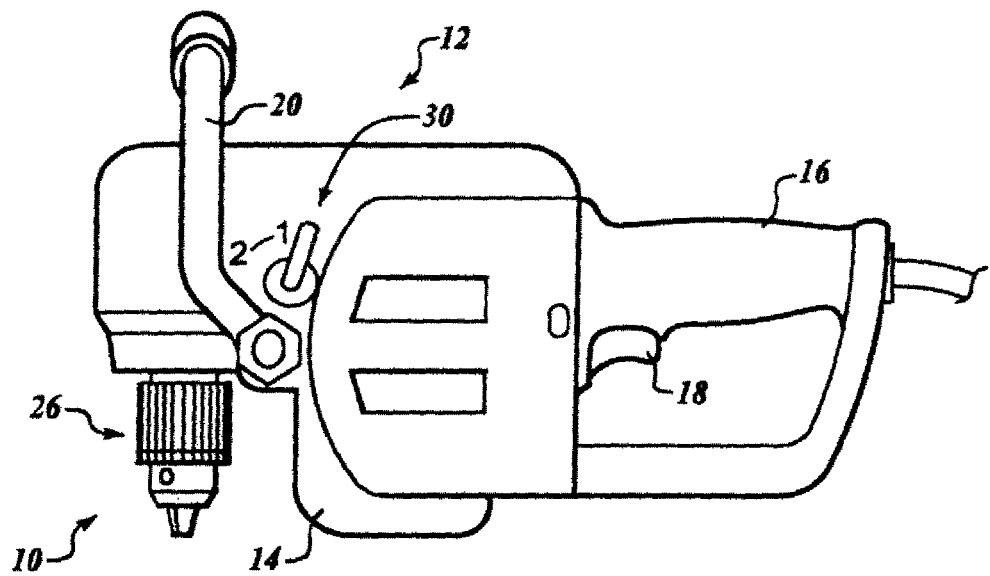
FIG. 1 is a perspective view of an exemplary right angle drill or driver constructed in accordance with the present teachings.

The following description is merely exemplary in nature and is not intended to limit the present teachings, their application or uses. It should be understood that throughout the drawings, corresponding reference numerals indicate like or corresponding parts and features.

The present teachings generally pertain to a powered drill or driver 10. In one aspect of the present teachings, the drill or driver 10 can be a right angle drill 12, as shown in FIG. 1. The right angle drill 12 can include a housing 14 having a handle 16 from which a trigger assembly 18 extends. A secondary handle 20 can also extend from the housing 14 to provide, for example, an additional hand hold for the user to hold the right angle drill 12.

Figure 7:
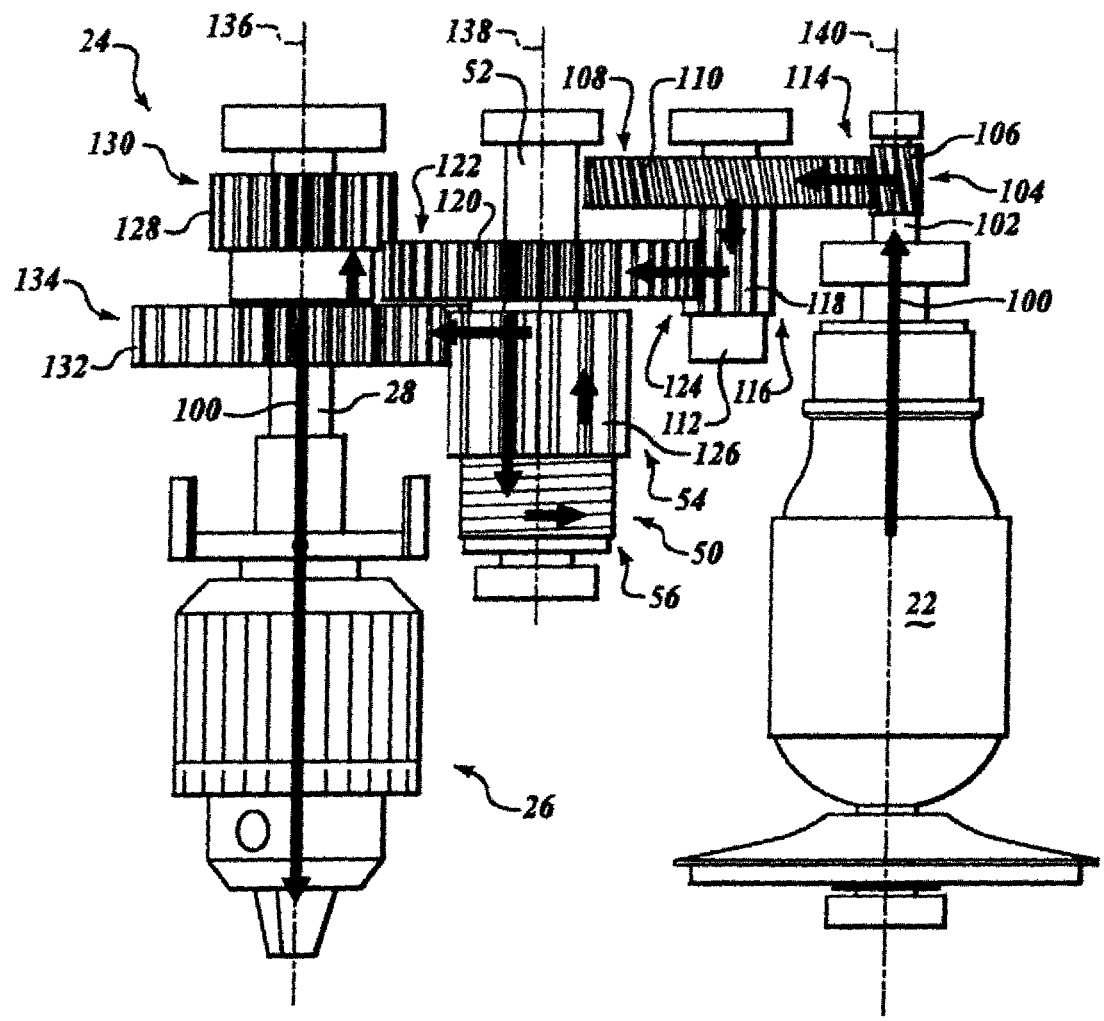
FIG. 7 is a diagram of a torque pathway through an exemplary right angle drive transmission showing a low speed condition in which a radially expanding spring clutch assembly is enabled (i.e., not bypassed) in accordance with the present teachings.
Figure 8:
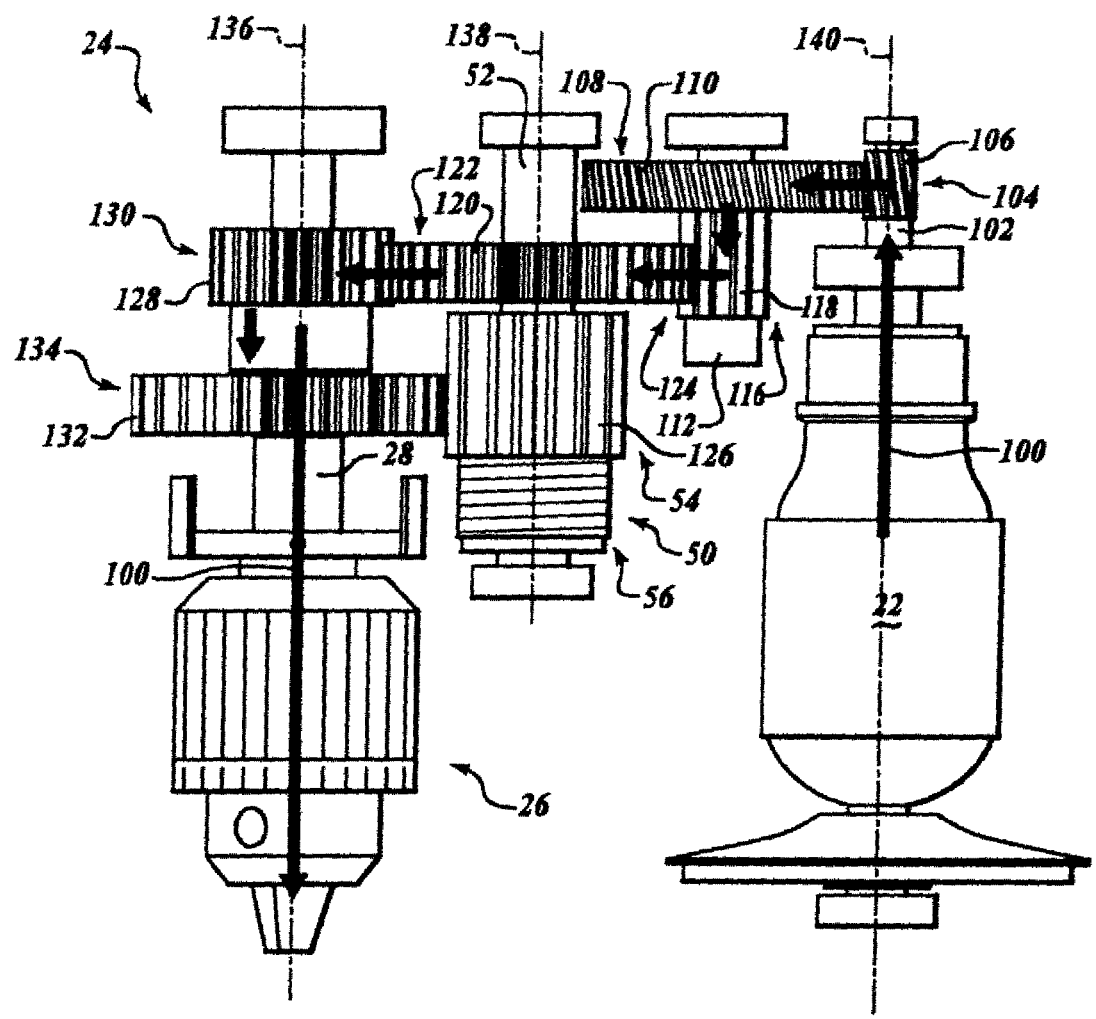
FIG. 8 is similar to FIG. 7 and shows a different torque pathway through the right angle drive transmission illustrating a high speed condition in which the radially expanding spring clutch assembly is bypassed in accordance with the present teachings.

The housing 14 can contain, for example, a motor 22 that can drive a transmission 24 that ultimately provides a torque output to a chuck assembly 26. The chuck assembly 26 can be attached to an end of a spindle shaft member 28, as shown in FIGS. 7 and 8. The trigger assembly 18 can be retracted to energize the motor 22 to drive the transmission 24. The chuck assembly 26 can be opened and closed to accept various tool bits.

It will be appreciated in light of the disclosure that the drill or driver 10 is but one example in which the transmission 24 can be used. The transmission 24 can be used in various power tools, consumer goods and/or any device with rotary power where the ability to limit and control torque can be a benefit. Examples include, but are not limited to, saws, yard tools, vacuums, routers, etc.

Returning to FIG. 1, a shifting mechanism 30 can be actuated by the user to change the transmission 24 of the right angle drive drill 12 between a first output speed and a second output speed. As shown in FIG. 7, for example, the first output speed can be a low speed condition. As shown in FIG. 8, for example, the second output speed can be a high speed condition. In one example, a gear ratio can be established between the low speed condition and the high speed condition that is about four to one.

Figure 2:
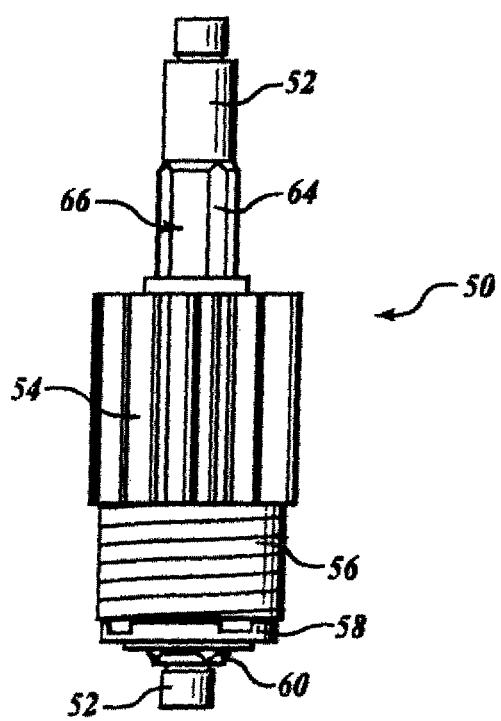
FIG. 2 is a front view of an exemplary radially expanding spring clutch constructed in accordance with the present teachings.

With reference to FIG. 2, the present teachings can also include a radially expanding clutch assembly 50 that can have a shaft member 52. The shaft member 52 can receive an input torque and a gear member 54 can provide an output torque. The radially expanding clutch assembly 50 can also include a clutch spring 56, a clutch washer 58 and/or a retaining ring 60, which can act to contain rolling members 62 within the radially expanding clutch assembly 50. In various aspects of the present teachings, the radially expanding clutch assembly 50 can be implemented with the transmission 24.

Figure 3:
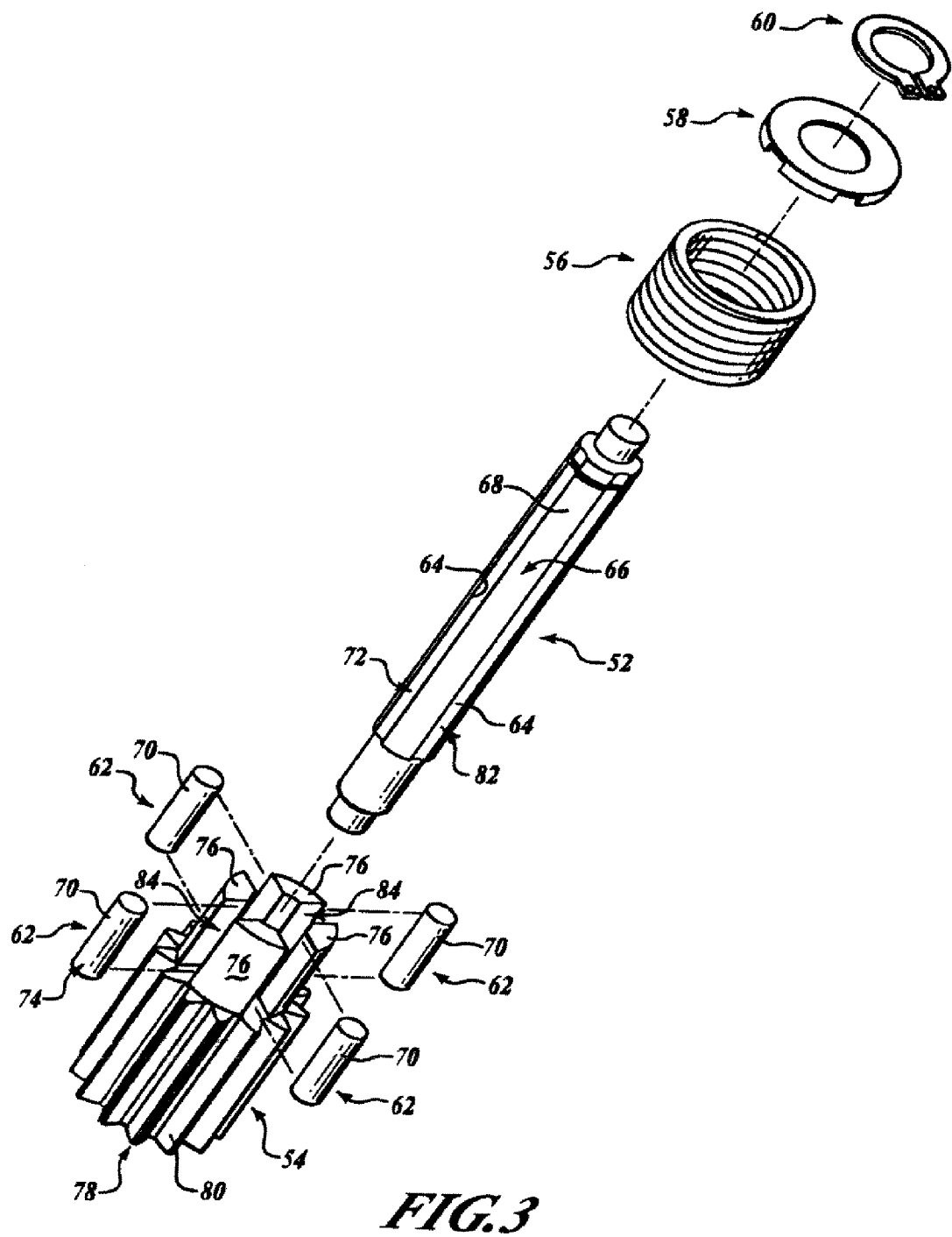
FIG. 3 is an exploded assembly view of the radially expanding spring clutch of FIG. 2 showing rolling members and a shaft member with longitudinal grooves configured to receive the rolling members in accordance with the present teachings.

In one example and with reference to FIG. 3, the shaft member 52 can include four longitudinal grooves 64 that are formed within the shaft member 52. The four longitudinal grooves 64 can interrupt an outer cylindrical surface 66 of the shaft member 52 and thus can form radial portions 68 between the four longitudinal grooves 64. These radial portions 68 can continue an outer surface contour of the outer cylindrical surface 66 of the shaft member 52.

Figure 9:
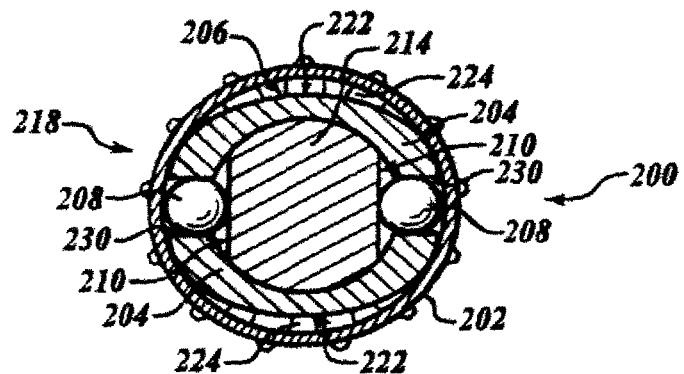
FIG. 9 is a diagram of a cross-sectional view of a radially expanding spring clutch shown in a drive condition constructed in accordance with additional aspects of the present teachings.
Figure 10:
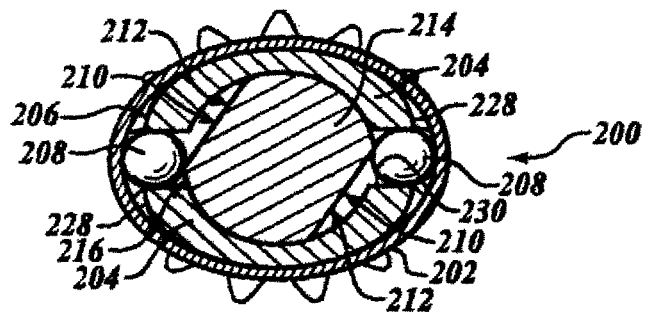
FIG. 10 is similar to FIG. 9 and shows the rolling members leaving the longitudinal grooves formed on a clutch shaft and stretching a clutch spring to form a generally elliptical shape in accordance with the present teachings.
Figure 11:
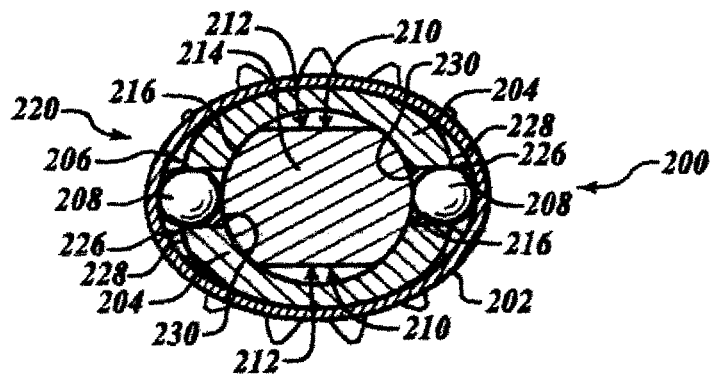
FIG. 11 is similar to FIG. 10 and shows the rolling members disposed on the outer cylindrical surface of the clutch shaft in a clutch out or reduced torque condition causing the clutch spring to stretch and form a generally elliptical shape in accordance with the present teachings.

The rolling members 62, in this example shown as pins 70, can reside within the longitudinal grooves 64 of the shaft member 52. As such, a curvature 72 of the longitudinal grooves 64 can be complimentary to a curvature 74 of one or more suitable rolling members 62 such as the pins 70. In other examples, the curvature 72 can define a substantially flat portion (i.e., little or no curvature) on which the rolling members 62 can reside such as the planes 210, as shown in FIGS. 9, 10, and 11. It will be appreciated in light of the disclosure that the curvature 72 and the curvature 74 can be the same or varied.

Figure 4:
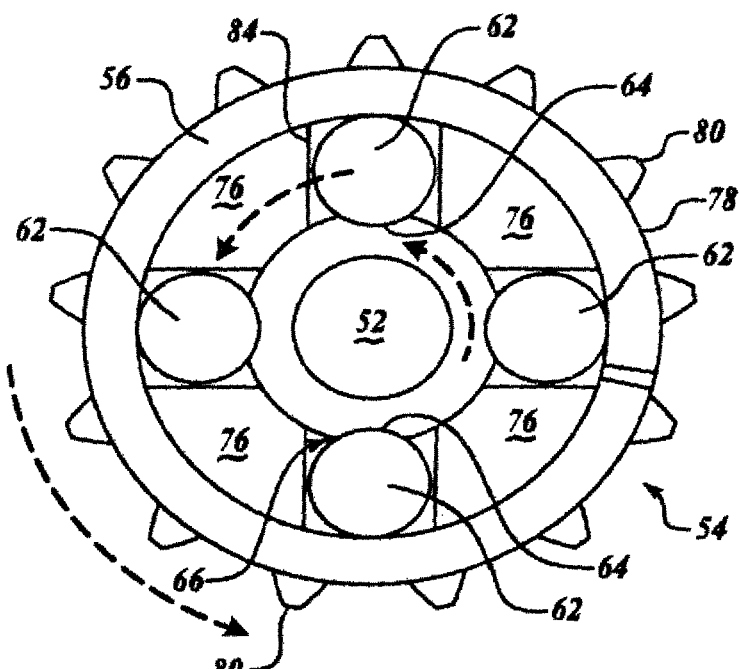
FIG. 4 is a diagram of a cross-sectional view of the radially expanding spring clutch of FIG. 2 in a drive condition and a low torque condition (i.e., below a threshold torque value) in accordance with the present teachings.

With reference to FIG. 2 and FIG. 3, the gear member 54 can have a plurality of lobes 76 that can extend from the gear member 54 and can be disposed between the rolling members 62, as shown in FIG. 4. The gear member 54 can also include a gear portion 78 having gear teeth 80 that can mesh with other components of the transmission 24. The clutch spring 56 can encircle (wholly or partially) the lobes 76 of the gear member 54 and the rolling members 62. In this regard, the clutch spring 56 can hold the rolling members 62 and the lobes 76 of the gear member 54 around the shaft member 52. The retaining ring 60 can hold the clutch washer 58 so as to contain the clutch spring 56 around the gear member 54.

Figure 24:
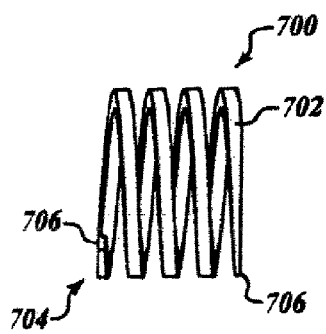
FIG. 24 is a perspective view of an exemplary clutch spring showing each of the helical coils separated from one another and ends of the coils configured with a reduced cross-section in accordance with the present teachings.
Figure 25:
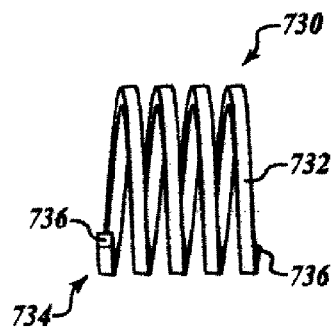
FIG. 25 is a perspective view of an exemplary clutch spring showing each of the helical coils separated from one another and ends of the coils configured in an open condition in accordance with the present teachings.
Figure 26:
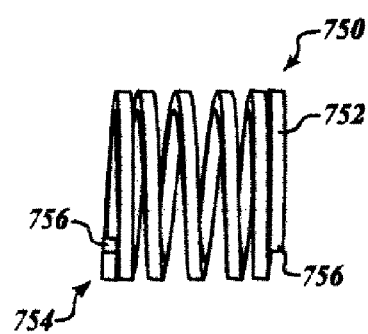
FIG. 26 is a perspective view of an exemplary clutch spring showing each of the helical coils separated from one another and ends of the coils configured in a closed condition in accordance with the present teachings.

In various aspects of the present teachings, the clutch spring 56, can define a single spring, multiple springs, other suitable compliant or elastic members and/or suitable combinations thereof. In one aspect, the clutch spring 56 can include helical coils that form a helical spring such that each of the helical coils contacts (or is disposed closely to) a successive helical coil, as illustrated in FIG. 2, which can provide a closed coil configuration. As shown in FIGS. 24, 25 and 26, the coils can be spaced from one another, which can provide an open coil configuration. It will be appreciated in light of the disclosure that the clutch spring can implemented in a cylindrical shape, a conical shape, other suitable shapes and one or more suitable combinations thereof.

Figure 5:
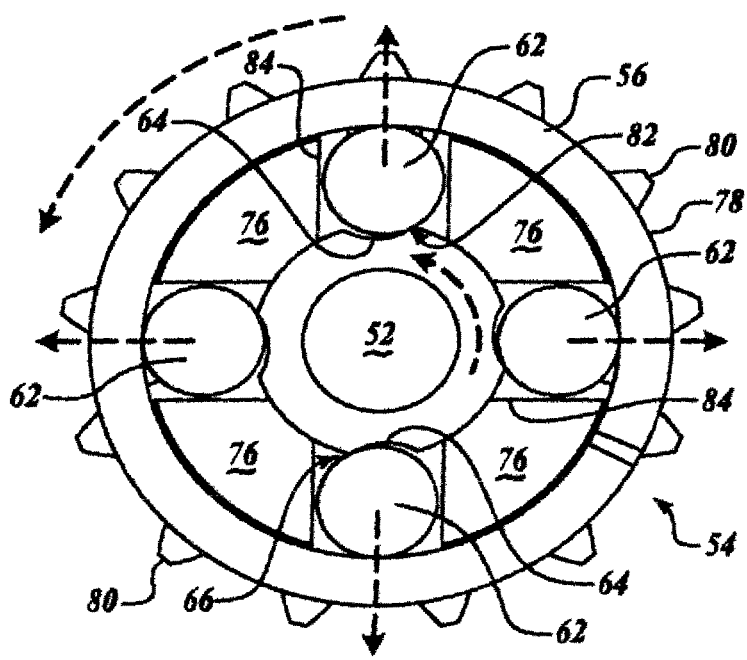
FIG. 5 is similar to FIG. 4 and shows the rolling members leaving longitudinal grooves of a shaft member as torque increases to just below a torque threshold value in accordance with the present teachings.
Figure 6:
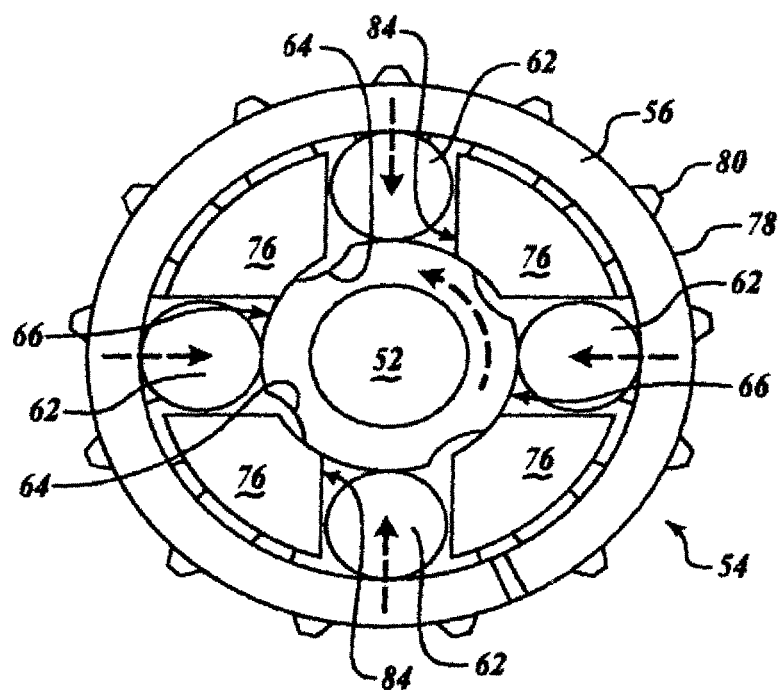
FIG. 6 is similar to FIG. 5 and shows the rolling members disposed on an outer cylindrical surface of the shaft member after leaving the longitudinal grooves formed thereon, as a value of torque at the shaft member has exceeded the torque threshold value in accordance with the present teachings.

FIGS. 4, 5 and 6 illustrate an exemplary progression of the radially expanding clutch assembly 50 changing between a drive condition in FIG. 4 and a clutch out or a reduced torque condition in FIG. 6. In the drive condition the radially expanding clutch assembly 50 is closed and can direct torque from the shaft member 52 to the gear member 54 with relatively little loss in torque. In the clutch out or reduced torque condition, as illustrated in FIG. 6, the radially expanding clutch assembly 50 is "open" and can direct torque at a reduced value (relative to the drive condition) from the shaft member 52 to the gear member 54.

It will be appreciated in light of the disclosure that in some instances torque can be directed from the gear member 54 to the shaft member 52. Moreover, the radially expanding clutch assembly 50, even in the clutch out or reduced torque condition (FIG. 6), can direct some torque to the gear member 54 because the outer cylindrical surface 66 can still impart some torque on the rolling members 62.

With reference to FIG. 4, the rolling members 62 can reside within the longitudinal grooves 64 of the shaft member 52 and, as such, the radially expanding clutch assembly 50 is in the drive condition. In the drive condition, torque can have an exemplary pathway from a surface 82 of the longitudinal grooves 64 via the rolling members 62 to a surface 84 of the lobes 76 that extend from the gear member 54. As a value of torque at the shaft member 52 surpasses a torque threshold value, the rolling members 62, as illustrated in FIG. 5, can move up the surface 82, out of the longitudinal grooves 64 and onto the outer cylindrical surfaces 66 of the shaft member 52, as shown in FIG. 6.

In FIG. 6, the rolling members 62 can move out of the longitudinal grooves 64 and can stretch (i.e., radially expand) the clutch spring 56 that can encircle (partially or wholly) the rolling members 62 and the lobes 76. The rolling members 62 can roll out of the longitudinal grooves 64 of the shaft member 52 and can be disposed between the clutch spring 56 and the outer cylindrical surfaces 66 of the shaft member 52. As such, the radially expanding clutch assembly 50, as shown in FIG. 6, can be in the clutch out or the reduced torque condition.

The radially expanding clutch assembly 50 can contain various amounts of rolling members 62. The rolling members 62 can be configured as the pins 70, balls, other suitable rolling members 62 and/or one or more combinations thereof. As illustrated in FIGS. 3, 4, 5, 6, 12 and 13, four rolling members 62 can be implemented with the examples of the radially expanding clutch assembly 50. As illustrated in FIGS. 9, 10 and 11, two rolling members 62 can be implemented with further examples of radially expanding clutch assembly 200.

With reference to FIG. 7 and FIG. 8, an example of the transmission 24 for the right angle driver or drill 12 (FIG. 1) can establish a torque pathway 100 (illustrated with arrows) that can define a low speed condition of the transmission 24 in accordance with the present teachings. In this example, the motor 22 can connect to an output shaft member 102 having a gear portion 104. The gear portion 104 having gear teeth 106 can connect to a gear portion 108 having gear teeth 110 that is on an intermediate shaft member 112. The meshing of the gear portion 104 on the output shaft member 102 with the gear portion 108 on the intermediate shaft member 112 can define a first reduction mesh 114.

The intermediate shaft member 112 can have a gear portion 116 having gear teeth 118 that can mesh with gear teeth 120 of a gear portion 122 that is on the shaft member 52. The meshing of the gear portion 108 on the intermediate shaft member 112 with the gear portion 122 on the shaft member 52 can form a second reduction mesh 124, i.e., two gear reductions. It will be appreciated in light of the disclosure that the intermediate shaft member 112, in some examples, can be omitted. In such examples, the gear portion 104 that is on the output shaft member 102 can directly mesh with the gear portion 122 that is on the shaft member 52 but this would necessarily omit one of the reduction meshes mentioned above, i.e., a single gear reduction.

Gear teeth 126 of the gear member 54 can mesh with the gear teeth 132 of a low speed gear portion 134 that is on the spindle shaft member 28. The gear teeth 120 of the gear portion 122 on the shaft member 52 can additionally mesh with gear teeth 128 of a high speed gear portion 130 that is on the spindle shaft member 28. The gear teeth 120, 128, however, can maintain a partial engagement with one another because the gear teeth 120, 128 of each of the respective gear portions 120, 130 do not completely line up, as illustrated in FIG. 7. In this example, however, the high speed gear portion 130 in the low speed condition is not engaged to the spindle shaft member 28 (i.e., the high speed gear portion 130 is free to rotate around the spindle shaft member 28). The partial engagement can be shown to reduce the effort of moving the high speed gear portion 130 relative to the gear portion 122 on the shaft member 52.

As shown in FIG. 7 and FIG. 8, the low speed gear portion 134 and the high speed gear portion 130 on the spindle shaft member 28 can move in a longitudinal direction that is generally parallel to a longitudinal axis 136 of the spindle shaft member 28. The shaft member 52 can have a longitudinal axis 138 and the output shaft member 102 can have a longitudinal axis 140. The high speed gear portion 130 and the low speed gear portion 134 can move together between the high speed condition illustrated in FIG. 8 and the low speed condition illustrated in FIG. 7.

In the low speed condition and with reference to FIG. 7, the low speed gear portion 134 can be engaged to the spindle shaft member 28 (i.e., not free to rotate around the spindle shaft member 28). In this arrangement, torque transmitted to the low speed gear portion 134 from the gear member 54 can drive the spindle shaft member 28 and ultimately the chuck assembly 26.

In the high speed condition and with reference to FIG. 8, the high speed gear portion 130 can be engaged to the spindle shaft member 28 (i.e., not free to rotate around the spindle shaft member 28). In the high speed condition, torque transmitted from the gear portion 104 of the output shaft member 102 to the gear portion 122 on the shaft member 52 is also directed to the high speed gear portion 130 on the spindle shaft member 28 and thus avoids the gear member 54. The radially expanding clutch assembly 50, in the above example, can therefore be bypassed in the high speed condition, as shown in FIG. 8.

In the low speed condition as shown in FIG. 7, the gear member 54 of the radially expanding clutch assembly 50 can drive the low speed gear portion 134 of the spindle shaft member 28 that is engaged to the spindle shaft member 28. When the torque value is below the threshold amount, the motor 22 can drive the spindle shaft member 28 via the low speed gear portion 134 of the spindle shaft member 28 and the gear member 54 of the radially expanding clutch assembly 50. In the high speed condition, as shown in FIG. 8, the motor 22 can drive the spindle shaft member 28 via the high speed gear portion 130 that can be engaged to the spindle shaft member 28 and the gear portion 122 on the shaft member 52. In this arrangement, the gear member 54 can provide little to no torque to the low speed gear portion 130.

As noted in the above examples, the transmission 24 can be switched between the high speed condition and the low speed condition and can provide a four to one gear ratio. In other aspects, the gear ratios established by the configuration of the gearing discussed throughout the disclosure can be configured in various aspects to, for example, produce different gear ratios to accommodate different requirements for the drill or driver 10. As needed, the torque threshold value can also be adjusted by varying the configuration of the surfaces 82, 84 of the longitudinal grooves 64 and/or the lobes 76, respectively, and/or adjusting the spring constant of the one or more clutch springs 56. It will be appreciated in light of the disclosure that while spur and helical gears are illustrated, various gear teeth configurations (i.e., spur, helical, hypoid, bevel, etc.) can be used on various gears in the transmission 24, as applicable.

In one example, the low speed gear portion 134 and the high speed gear portion 130 are separate gears that move relative to the spindle shaft member 28. The gears can engage and disengage to the spindle shaft member 28 by engaging with splines formed on the spindle shaft member 28 that can mesh with splines formed on the gears. In one longitudinal position along the spindle shaft member 28, the splines can be engaged and, in other longitudinal positions, the splines can be separated (i.e., axially disposed from one another) so that the gear can spin freely around the spindle shaft member 28. It will be appreciated that the splines, gear teeth, etc. can be formed with various suitable manufacturing processes, such as hobbing, index milling, grinding, etc. In other examples, the gears, splines, etc. can be formed with powdered metal forming techniques.

In operation, as the motor 22 drives the transmission 24, the transmission 24 can reduce rotational velocity and increase torque relative to an initial rotational velocity and initial torque provided by the motor 22. As long as the value of torque at the shaft member 52 remains below the torque threshold value, the radially expanding clutch assembly 50 can remain in the drive condition. In the drive condition, the shaft member 52 can drive the gear member 54 with relatively little loss in the value of the torque across the radially expanding clutch assembly 50.

With reference to FIGS. 9, 10 and 11, one alternative example of a radially expanding clutch assembly 200 is shown with a clutch spring 202 and/or other suitable compliant portions. The clutch spring 202 can be a unitary member (e.g., a sleeve) that can encircle (partially or wholly) the lobes 204 of a gear member 206 and/or rolling members 208. Similar to the radially expanding clutch assembly 50 (FIG. 2) discussed above, as the value of torque surpasses the torque threshold value, the rolling members 208 can roll beyond planes 210. The planes 210 can be longitudinal grooves 212 that can be substantially flat, i.e., little or no curvature. As the rolling members 208 move from the planes 210 to the outer cylindrical surface 216, the radially expanding clutch assembly 200 moves from a drive condition (FIG. 9) to a clutch out (reduced torque) condition (FIG. 11), as the shaft member 214 is no longer able to impart substantial torque to the gear member 206.

With reference to FIG. 9, the clutch spring 202 is shown in a generally circular shape 218 that can be indicative of the drive condition. In the drive condition, the radially expanding clutch assembly 200 can deliver about the same amount of torque between the shaft member 214 and the gear member 206.

With reference to FIG. 11, the clutch spring 202 is shown in generally an elliptical shape 220, which is indicative of the clutch out or the reduced torque condition. In the clutch out or reduced torque condition, torque delivered at the gear member 206 of the radially expanding clutch assembly 200 is reduced relative to the value of torque at the shaft member 214. As the rolling members 208 roll beyond the planes 210, the rolling members 208 can move onto the outer cylindrical surface 216 of the shaft member 214. When the rolling members 208 move onto the outer cylindrical surface 216, the rolling members 208 can stretch (i.e., radially expand) the clutch spring 202 so as to form generally the elliptical shape 220 (FIG. 11).

The lobes 204 of the gear member 206 can have an arcuate outer surface 222. A shape of the arcuate outer surface 222 and the configuration of the clutch spring 202 in the drive condition can define a space 224 between the clutch spring 202 and the arcuate outer surface 222 of the lobe 204. With reference to FIG. 11, the clutch spring 202 in the generally elliptical shape 220 can be stretched to a degree such that portions of the clutch spring 202 can reduce or eliminate the space 224 in the reduced torque condition.

In one example, the clutch spring 202 can fully contact the arcuate outer surface 222 and in other examples the clutch spring 202 can approach the arcuate outer surface 222. When the clutch spring 202 expands to take the generally taken the elliptical shape 220 and the radially expanding clutch assembly 200 is in the clutch out or reduced torque condition, the clutch spring 202 can additionally form spaces 226 between ends 228 of the lobes 204 and the clutch spring 202 adjacent to the rolling members 208. The ends 228 of the lobes 204 can be adjacent to surfaces 230 that can abut the rolling members 208.

Figure 12:
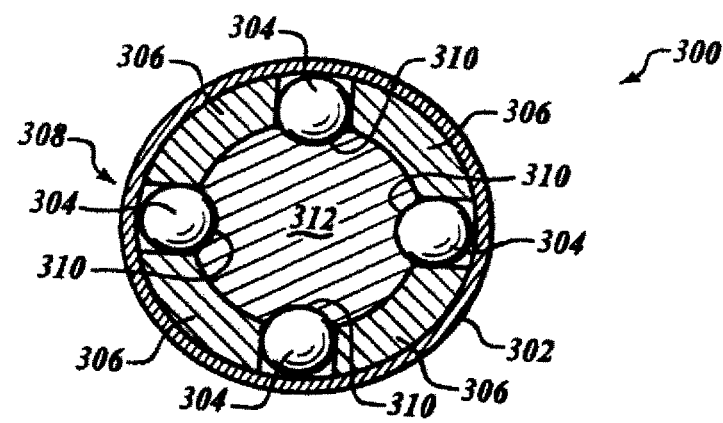
FIG. 12 is a diagram of a cross-sectional view of a radially expanding spring clutch having four rolling members disposed between four lobes of a clutch gear with an exemplary unitary clutch spring encircling the rolling members and the four lobes on the clutch gear in accordance with further aspects of the present teachings.

In accordance with various aspects of the present teachings and with reference to FIG. 12, a radially expanding clutch assembly 300 can be similar to the radially expanding clutch assembly 50, as shown in FIG. 4. The radially expanding clutch assembly 300 can have a clutch spring 302 that can encircle (partially or wholly) rolling members 304 and lobes 306 of a gear member 308. The rolling members 304 can be disposed in longitudinal grooves 310 formed in a shaft member 312. In one aspect, the clutch spring 302 can be a unitary member (e.g., a sleeve) and, as such, can continuously encircle the rolling members 304 and the lobes 306.

Figure 13:
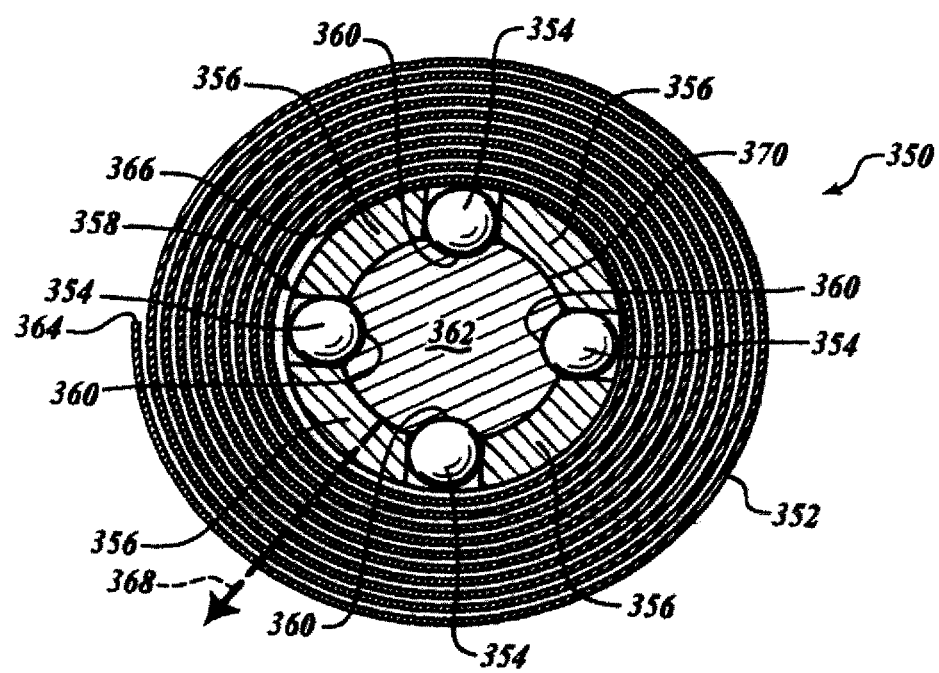
FIG. 13 is similar to FIG. 12 and shows an exemplary clutch spring that can be a helical spring configured such that portions of the coil are at an increasing radial distance from a shaft member in accordance with yet further aspects of the present teachings.

With reference to FIG. 13, a radially expanding spring clutch assembly 350 can be similar to the radially expanding clutch assembly 300, as shown in FIG. 12. The radially expanding spring clutch assembly 350 can have a clutch spring 352 that can encircle (partially or wholly) rolling members 354 and lobes 356 of a gear member 358. The rolling members 354 can be disposed in longitudinal grooves 360 formed in a shaft member 362. The clutch spring 352 can be a coil spring or a power spring or also may be referred to as a spiral coiled spring.

In one aspect, an outside end 364 of the clutch spring 352 can be revolved around an inside end 366 of the clutch spring 352 so as to tighten or loosen the clutch spring 352. Tightening of the clutch spring 352 can increase the torque threshold value associated with the spring clutch assembly 300. As illustrated in FIG. 13, the outside end 364 can be revolved in a clockwise direction relative to the inside end 366 to increase a spring force exerted by the clutch spring 352. The outside end 364 can also be revolved in a counterclockwise direction relative to the inside end 366 to decrease the spring force exerted by the clutch spring 352 thus decreasing the torque threshold value. Portions of clutch spring 352 can be spaced at increasing radial distances from the shaft member 362, e.g., a spiral wound spring. The increasing radial distance can be along an arrow 368 that can be generally perpendicular to an outer cylindrical surface 370 of the shaft member 362.

Figure 14:
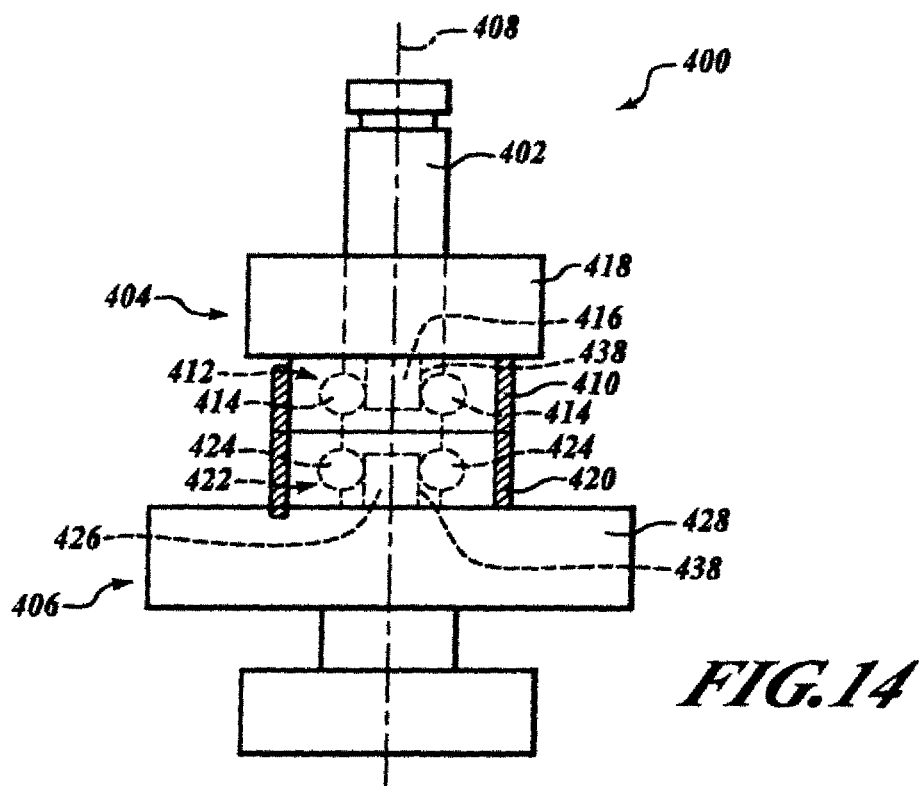
FIG. 14 is a diagram of a variable radially expanding spring clutch having a first output gear can be engaged to a shaft member to provide a first gear ratio and a second gear can be disengaged from the shaft member in accordance with further aspects of the present teachings.
Figure 15:
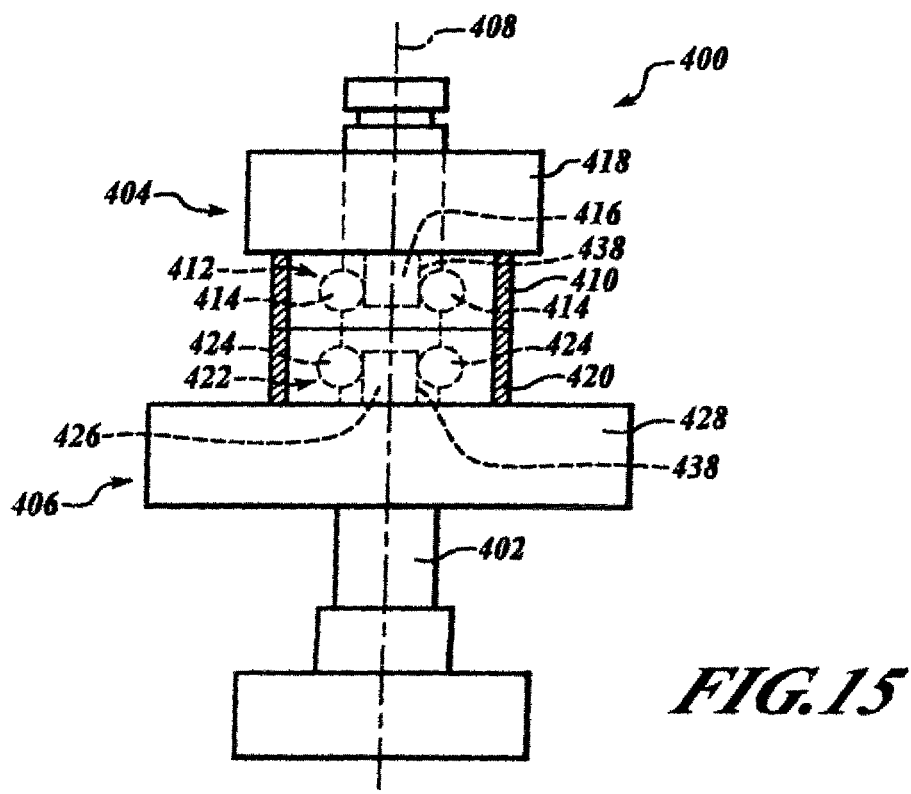
FIG. 15 is similar to FIG. 14 and shows the first gear disengaged and the second gear engaged to the clutch shaft to provide a second gear ratio in accordance with the present teachings.
Figure 16:
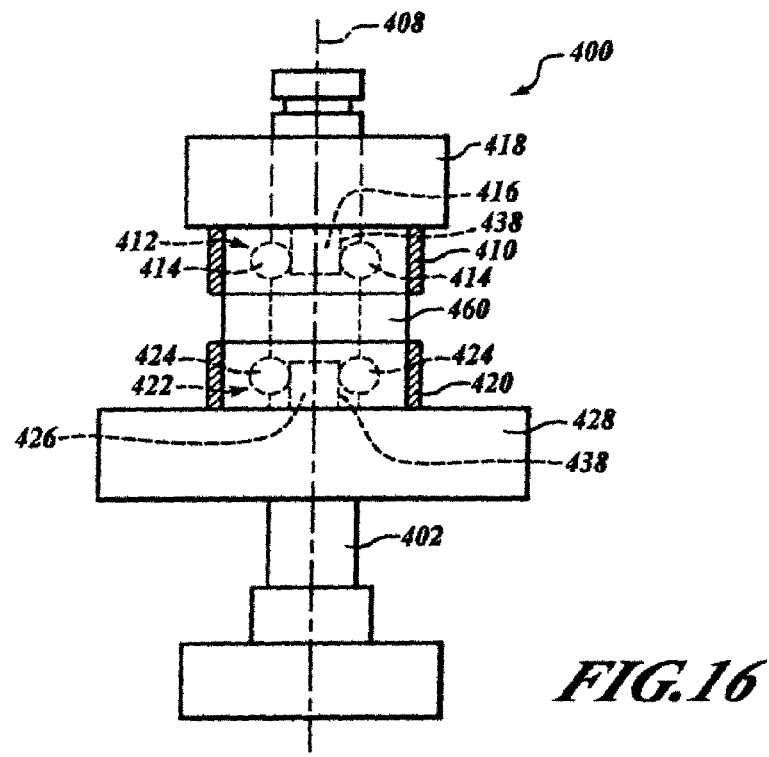
FIG. 16 is similar to FIG. 14 and shows separate clutch springs associated with the first and second gear assemblies longitudinally spaced from one another in accordance with the present teachings.

With reference to FIGS. 14, 15 and 16, a transmission 400 includes a shaft member 402 on which a first gear assembly 404 and second gear assembly 406 can move generally about a longitudinal axis 408 of the shaft member 402. The first gear assembly 404 can include a first clutch spring 410 that holds a first set 412 of rolling members 414 between lobes 416 that can extend from a first output gear 418. A second gear assembly 406 can include a second clutch spring 420 that can hold a second set 422 of rolling members 424 between lobes 426 that extend from a second output gear 428.

The first output gear 418 and the second output gear 428 can move longitudinally along the shaft member 402 to a position that can cause one or both of the output gears 418, 428 to engage for rotation with the shaft member 402. More specifically, the shaft member 402 can include a continuous cylindrical surface portion 430 that can be longitudinally disposed next to a cylindrical outer surface portion 432 that can be interrupted by longitudinal grooves 434. In one example, the longitudinal grooves 434 can be formed at equally spaced radial positions along the shaft member 402.

When the first gear assembly 404 is engaged to the shaft member 402, the first set 412 of rolling members 414 can be held within the longitudinal grooves 434 of the shaft member 402. When torque is imparted on the shaft member 402, a surface 436 of the longitudinal grooves 434 can transfer torque to a surface 438 of the lobes 416 of the first output gear via the rolling members 414. As the value of torque surpasses a torque threshold value at the shaft member 402, the first set 412 of rolling members 414 can be urged out of the longitudinal grooves 434 and migrate to the cylindrical outer surface portion 432 of the shaft member 402. Once the first set 412 of rolling members 414 advance along the surface 436 of the longitudinal grooves 434 to arrive at the cylindrical outer surface portion 432 of the shaft member 402. In this regard, the transmission 400 can move from a drive condition to a reduced torque or clutch out condition.

Figure 18:
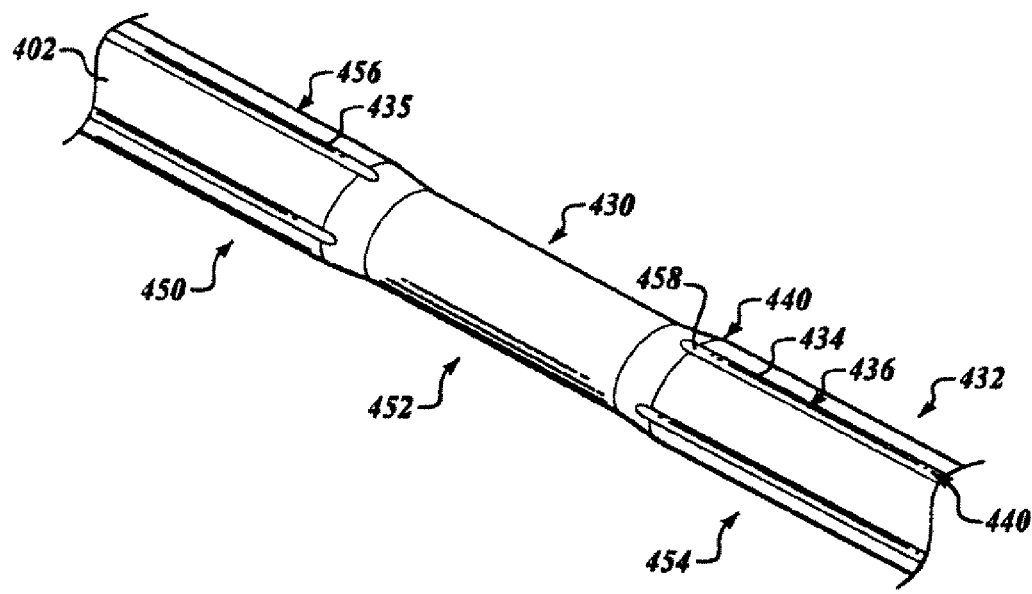
FIG. 18 is a perspective view of an exemplary shaft member of a radially expanding spring clutch assembly showing longitudinal grooves formed in one region of the shaft member and another region with a reduced diameter continuous cylindrical portion in accordance with the present teachings.

In one example and with reference to FIG. 18, the surfaces 436 of the longitudinal grooves 434 can define a curvature 440 that can vary along longitudinal positions of the shaft member 402. The first gear assembly 404 and/or the second gear assembly 406 can engage the shaft member 402 at specific longitudinal positions of the shaft member 402. The curvature 440 of the longitudinal grooves 434 at the specific longitudinal positions can correlate with a known and predetermined torque threshold value. If a different torque threshold value is required, the first gear assembly 404 and/or the second gear assembly 406 can be moved along the shaft member 402 so that the rolling members 414, 424, as applicable, engage the longitudinal grooves 434 in a longitudinal position with a different curvature of the longitudinal groves 434 thus a different torque threshold value.

The shaft member 402 can have at least three regions: a first region 450, a second region 452 and a third region 454. The first region 450 can define a continuous cylindrical outer surface 456 that can be at a nominal shaft diameter; nominal being relative to the diameter of the shaft member 402 in the second region 452. To that end, the second region 452 can define the continuous cylindrical surface portion 430. The third region 454 can define the cylindrical outer surface portion 432 that is interrupted by the longitudinal grooves 434. In one example, the first region 450 can define a continuous cylindrical outer surface 456 that can otherwise be interrupted by longitudinal grooves 435 that can be similar to (or different from) longitudinal grooves 434.

In one aspect, the continuous cylindrical surface portion 430 that can have a reduced diameter relative to the continuous cylindrical surface portion 456 in the first region 450. The first gear assembly 404, for example, can move longitudinally from having the rolling members 414 contained within the longitudinal grooves 434 (i.e., engaged to the shaft member 402) to a location on the shaft member 402 where the rolling members 414 contact the continuous cylindrical surface portion 430 having the reduced diameter. Because the continuous cylindrical surface portion 430 lacks any longitudinal grooves 434, the first gear assembly is free to rotate around the shaft member 402.

The clutch spring 410 and the clutch spring 420 can each be a single unitary member and can encircle (partially or wholly) both the first and second set of rolling members 414, 424 on the first and second gear assembly 404, 406 thus encircling the lobes 416, 426 and rolling members 414, 424 in each of the gear assemblies 404, 406. In further aspects, separate clutch springs, can be used with the first gear assembly 404 and a second gear assembly 406 respectively. The first clutch spring 410 can have a first spring constant and the second clutch spring 420 can have a second spring constant.

In some examples, the spring constants can be equal and in other examples, the spring constants can be different. It will be appreciated in light of the disclosure that the threshold torque value associated with one or more of the gear assemblies 414, 424 can be adjusted by altering the curvature of the longitudinal grooves, the angle of the surface of the lobes to which the rolling members connect, the spring constant of the respective clutch springs and/or one or more combinations thereof.

Figure 17:
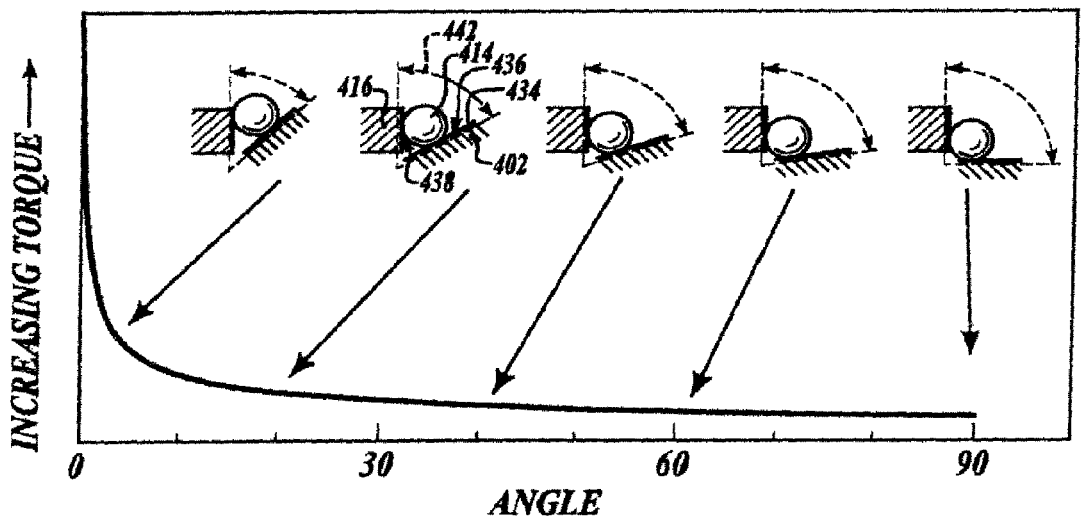
FIG. 17 is a diagram showing an angle and an associated torque threshold value; the angle being defined between a surface of the longitudinal grooves of the shaft member and a surface of the lobes of a gear member in accordance with the present teachings.

In FIG. 17, a relationship between a value of an angle 442 and the torque threshold value is shown. With respect to the transmission 400 illustrated in FIGS. 14, 15 and 16, the angle 442 can be defined between the surface 438 of the lobes 416 in the first gear assembly 404 and the surface 436 of the longitudinal grooves 434 of the shaft member 402. The relationship between the value of the angle 442 and the torque threshold value is shown such that as the angle 442 decreases, the value of the torque threshold increases. In other examples, the angle 442 can be defined between the surface 84 of the lobes 76 and the surface 82 of the longitudinal grooves 64, as shown in FIGS. 3, 4, 5 and 6. In a further example, the angle 442 can be defined between the plane 210 and the abutting end 230 of the lobes 204, as shown in FIGS. 9, 10 and 11.

Figure 19:
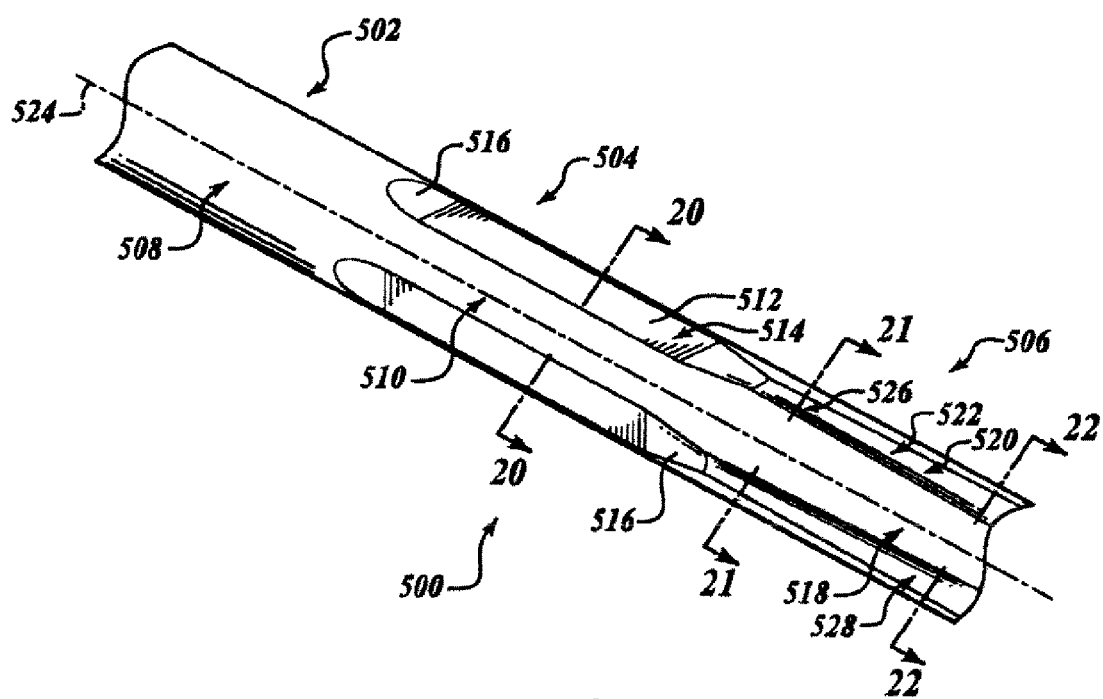
FIG. 19 is a perspective view of another exemplary shaft member having longitudinal grooves whose curvature changes along a longitudinal axis of the shaft member in accordance with further aspects of the present teachings.

With reference to FIG. 19, an exemplary shaft member 500 is shown having at least three regions: a first region 502, a second region 504 and a third region 506. The first region 502 can include a continuous cylindrical surface portion 508. The second region 504 can include a cylindrical surface portion 510 interrupted by longitudinal grooves 512. In this example, the longitudinal grooves 512 can define planar portions 514, i.e., no curvature. Ramps 516 or other suitable contoured portions can provide one or more transitions between the regions 502, 504, 506.

The third region 506 can include a cylindrical surface portion 518 interrupted by longitudinal grooves 520 having a curvature 522. The curvature 522 of the longitudinal grooves 520 can vary along a longitudinal axis 524 so as to have a first curvature 526 and a second curvature 528 at specific locations along the shaft member 500.

Figure 20:
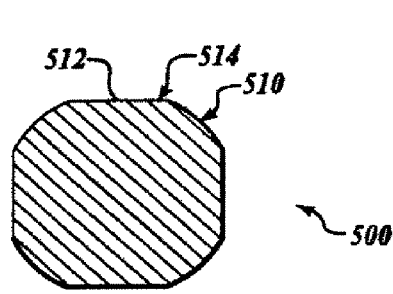
FIG. 20 is a diagram of a cross-sectional view of the clutch shaft of FIG. 19 showing the curvature of the longitudinal grooves being substantially flat in accordance with the present teachings.
Figure 21:
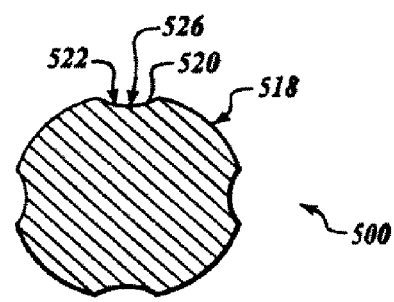
FIG. 21 is a diagram of a cross-sectional view of the shaft member of FIG. 19 showing the curvature of the longitudinal grooves in accordance with the present teachings.

With reference to FIG. 20, a cross-section of the shaft member 500 is shown at a particular longitudinal location. At this longitudinal location, the longitudinal grooves 512 are configured to have planar portions 514 that interrupt the cylindrical outer surface portions 510 of the shaft member 500. With reference to FIG. 21, another longitudinal location of the shaft member 500 is shown. In this longitudinal location, the outer cylindrical surface portion 518 is interrupted by longitudinal grooves 520 having the curvature 522 that can establish a first curvature configuration 526 that is associated with a predetermined torque threshold value.

Figure 22:
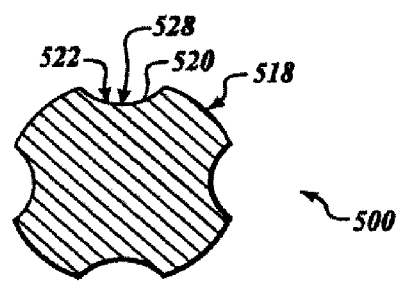
FIG. 22 is similar to FIG. 21 and shows differing curvature at a different longitudinal location along the shaft member configured to produce a higher or lower torque threshold value in accordance with the present teachings.

With reference to FIG. 22, an additional longitudinal location is shown of the shaft member 500. In this longitudinal location, the outer cylindrical portion 518 is interrupted by the longitudinal grooves 520 having the curvature 522 configured with a second curvature configuration 528 that is associated with another predetermined torque threshold value. It will be appreciated in light of the disclosure that the first gear assembly 404 and/or the second gear assembly 406 can be orientated along the shaft member 500 so that the respective rolling members 414, 416 can reside in the longitudinal grooves 520 at one or more of the above specific longitudinal locations.

Figure 23:
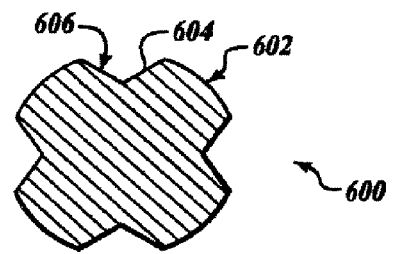
FIG. 23 is a diagram of a cross-sectional view of another exemplary shaft member showing a curvature of longitudinal grooves including a v-shaped configuration in accordance with the present teachings.

With reference to FIG. 23, an alternative exemplary shaft member 600 can include an outer cylindrical surface portion 602 that is interrupted by the longitudinal grooves 604. The longitudinal grooves 604 can include a curvature 606. The curvature 606 can be configured in a V-shape. It will be appreciated in light of the disclosure that changing the configuration of the v-shape curvature can also adjust the torque threshold value.

In various aspects of the present teachings and with reference to FIG. 24, a clutch spring 700 can include helical coils 702 that can provide a helical spring 704 such that each of the helical coils 702 is spaced apart from each other. Ends 706 (one end or both ends) of the helical coils 702 can have a reduced cross-section (e.g., a ground end) so that when, for example, the clutch spring 700 is compressed axially, the ends 706 of the clutch spring 700 can provide a relatively more flat end of the clutch spring 700.

The clutch spring 700 can define a substantially flat cross-section that can be maintained throughout the entire clutch spring 700 or portions thereof. The substantially flat cross-section can define a generally rectangular cross-section having two parallel sides that are substantially longer than the adjacent pair of parallel sides so as establish the substantially flat cross-section. In addition, intersections of the parallel sides (i.e., corners) can be rounded or chamfered.

With reference to FIG. 25, a clutch spring 730 can include helical coils 732 that can provide a helical spring 734 such that each of the helical coils 732 is spaced apart from each other. Ends 736 (one end or both ends) of the helical coils 732 can be spaced from the immediately adjacent helical coil so as to establish an open condition, i.e., the ends 736 of the helical coils 732 do not touch other portions of the clutch spring 730. Like the clutch spring 700, the clutch spring 730 can define a substantially flat cross-section that can be maintained throughout the entire clutch spring 730 or portions thereof.

With reference to FIG. 26, a clutch spring 750 can include helical coils 752 that can provide a helical spring 754 such that each of the helical coils 752 is spaced apart from each other. The ends 756 (one end or both ends) of the helical coils 752 are configured to contact the immediately adjacent helical coil so as to establish a closed end condition, i.e., the ends 756 of the helical coils 752 do touch (or are positioned relatively close to) other portions of the clutch spring 750. Like the clutch spring 700, the clutch spring 750 can define a substantially flat cross-section that can be maintained throughout the entire clutch spring 750 or portions thereof. It will be appreciated in light of the disclosure that one or more of clutch springs 700, 730, 750 can implemented similar to clutch spring 56, 202, 302, 352, 410, 420 (FIGS. 2, 9, 12, 13 and 14). It will also be appreciated in light of the disclosure that other suitable cross-sections of the clutch spring can used, such as, but not limited to, square and circular cross-sections. Furthermore, the radially expanding clutch spring can implemented in a cylindrical shape, a conical shape, other suitable shapes and one or more suitable combinations thereof.

While specific aspects have been described in the specification and illustrated in the drawings, it will be understood by those skilled in the art that various changes can be made and equivalence can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:

1. A transmission comprising:
    a shaft member having a cylindrical outer surface in which longitudinal grooves are formed;
    a single pair of rolling members disposed in said longitudinal grooves and positioned approximately 180 degrees apart relative to a perimeter of the cylindrical outer surface of the shaft member;
    a gear member having lobes, said lobes disposed between said rolling members and over said shaft member;
    a clutch spring that at least partially encircles said rolling members and said lobes, said clutch spring having a reduced torque condition that at least defines said clutch spring stretching to accommodate said rolling members leaving said longitudinal grooves and moving to said outer cylindrical surface such that said clutch spring forms a generally elliptical shape in said reduced torque condition.

2. The transmission of claim 1, wherein said clutch spring of the clutch moves from a drive condition to said reduced torque condition when a value of torque surpasses a threshold value, wherein said threshold value is at least based on an angle between a surface of one of said longitudinal grooves and a surface of one of said lobes between which one of said rolling members is disposed and wherein when a value of said angle decreases, said torque threshold value increases.

3. The transmission of claim 1, wherein at least two of said longitudinal grooves are each substantially flat so as to be generally parallel to one another.

4. The transmission of claim 1, wherein a portion of said longitudinal grooves has a curvature that defines at least one of a plane, a v-shape, a radius, a ramp and one or more combinations thereof.

5. The transmission of claim 1, wherein said clutch spring is an annular unitary sleeve around said rolling members and said lobes.

6. The transmission of claim 1, wherein said clutch spring includes helical coils that form a helical spring and wherein each of said helical coils contacts a successive coil.

7. The transmission of claim 1, wherein said clutch spring includes helical coils that form a helical spring and wherein each of said coils is spaced apart from each other.

8. The transmission of claim 1, wherein the single pair of rolling members move radially outward from the shaft member to stretch the clutch spring in the reduced torque condition, such that the clutch spring forms the generally elliptical shape.

9. The transmission of claim 1, wherein the lobes comprise a single pair of lobes disposed approximately 180 degrees apart.

10. The transmission of claim 9, wherein each of the lobes define a generally arcuate outer surface having a generally non-circular elliptical shape.

11. The transmission of claim 10, further comprising a space defined between the arcuate outer surface of the lobes and the clutch spring, wherein a portion of the clutch spring moves toward the arcuate outer surface of the lobes in the reduced torque condition such that the space becomes smaller and the clutch spring forms the generally elliptical shape.

12. A transmission comprising:
an input member having a cylindrical outer surface with a single pair of longitudinal grooves formed generally 180 degrees apart;
a single pair of rolling members disposed in said longitudinal grooves;
an output member having a single pair of lobes; each of said lobes disposed between said rolling members and over said input member, and having a generally arcuate outer surface with a generally non-circular elliptical shape; and
a clutch spring that at least partially encircles said rolling members and said lobes,
wherein, in a torque transmission condition, the clutch spring presses the rolling members into the grooves to enable torque transmission from the input member to the output member, and
in a reduced torque condition, the balls move radially outward from the grooves so that the clutch spring expands to a generally elliptical shape to inhibit torque transmission from the input member to the output member.

13. The transmission of claim 12, wherein the clutch spring moves from the torque transmission condition to the reduced torque condition when a value of torque surpasses a threshold value, wherein said threshold value is at least based on an angle between a surface of one of said longitudinal grooves and a surface of one of said lobes between which one of said rolling members is disposed and wherein when a value of said angle decreases, said torque threshold value increases.

14. The transmission of claim 12, wherein a portion of the longitudinal grooves has a curvature that defines at least one of a plane, a v-shape, a radius, a ramp and one or more combinations thereof.

15. The transmission of claim 12, wherein the clutch spring includes helical coils that form a helical spring and wherein each of said helical coils contacts a successive coil.

16. The transmission of claim 12, wherein the clutch spring includes helical coils that form a helical spring and wherein each of said coils is spaced apart from each other.

17. A transmission comprising:
a shaft member having a cylindrical outer surface in which longitudinal grooves are formed;
rolling members disposed in said longitudinal grooves;
a gear member having a single pair of lobes, said lobes disposed approximately 180 degrees apart between said rolling members and over said shaft member;
a clutch spring that at least partially encircles said rolling members and said lobes, said clutch spring having a reduced torque condition that at least defines said clutch spring stretching to accommodate said rolling members leaving said longitudinal grooves and moving to said outer cylindrical surface such that said clutch spring forms a generally elliptical shape in said reduced torque condition.

18. The transmission of claim 17, wherein each of the lobes define a generally arcuate outer surface having a generally non-circular elliptical shape.

19. The transmission of claim 18, further comprising a space defined between the arcuate outer surface of the lobes and the clutch spring, wherein a portion of the clutch spring moves toward the arcuate outer surface of the lobes in the reduced torque condition such that the space becomes smaller and the clutch spring forms the generally elliptical shape.

20. The transmission of claim 17, wherein said clutch spring of the clutch moves from a drive condition to said reduced torque condition when a value of torque surpasses a threshold value.

* * * * *